US008513332B2

(12) United States Patent
Park et al.

(10) Patent No.: US 8,513,332 B2
(45) Date of Patent: Aug. 20, 2013

(54) INK COMPOSITION FOR COLOR FILTER, METHOD FOR PREPARING A COLOR FILTER USING THE SAME, AND COLOR FILTER

(75) Inventors: Jong-Seung Park, Uiwang (KR); In-Jae Lee, Seoul (KR); Jin-Ki Hong, Seoul (KR); Seung-Joo Shin, Seoul (KR); Sung-Woong Kim, Suwon (KR); Tae-Woon Cha, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 545 days.

(21) Appl. No.: 12/761,473

(22) Filed: Apr. 16, 2010

(65) Prior Publication Data

US 2010/0195232 A1   Aug. 5, 2010

Related U.S. Application Data

(63) Continuation-in-part of application No. PCT/KR2007/007039, filed on Dec. 31, 2007.

(30) Foreign Application Priority Data

Oct. 18, 2007  (KR) .......................... 10-2007-0105130

(51) Int. Cl.

| | |
|---|---|
| A61K 9/16 | (2006.01) |
| A61L 15/62 | (2006.01) |
| B05D 5/12 | (2006.01) |
| B32B 27/28 | (2006.01) |
| B41J 2/01 | (2006.01) |
| B41J 2/17 | (2006.01) |
| B41J 2/175 | (2006.01) |
| C02F 1/52 | (2006.01) |
| C03C 25/10 | (2006.01) |
| C08F 8/00 | (2006.01) |
| C08F 16/26 | (2006.01) |
| C08F 20/08 | (2006.01) |
| C08F 22/04 | (2006.01) |
| C08F 24/00 | (2006.01) |
| C08F 32/00 | (2006.01) |
| C08F 116/16 | (2006.01) |
| C08F 120/08 | (2006.01) |
| C08F 122/04 | (2006.01) |
| C08F 124/00 | (2006.01) |
| C08F 132/00 | (2006.01) |
| C08F 220/06 | (2006.01) |
| C08F 222/04 | (2006.01) |
| C08F 232/00 | (2006.01) |
| C08G 59/14 | (2006.01) |
| C08G 63/48 | (2006.01) |
| C08G 63/91 | (2006.01) |
| C08G 73/10 | (2006.01) |
| C08J 3/28 | (2006.01) |
| C08K 5/00 | (2006.01) |
| C08K 5/06 | (2006.01) |
| C08K 5/09 | (2006.01) |
| C08K 5/10 | (2006.01) |
| C08K 5/101 | (2006.01) |
| C08K 5/103 | (2006.01) |
| C08L 25/02 | (2006.01) |
| C08L 31/00 | (2006.01) |
| C08L 33/00 | (2006.01) |
| C08L 33/06 | (2006.01) |
| C09B 67/00 | (2006.01) |
| C09D 5/00 | (2006.01) |
| C09D 5/02 | (2006.01) |
| C09D 11/00 | (2006.01) |
| C09D 11/10 | (2006.01) |
| C09J 7/02 | (2006.01) |
| C09J 125/02 | (2006.01) |
| G01D 11/00 | (2006.01) |
| G02F 1/1335 | (2006.01) |
| G03F 1/00 | (2012.01) |

(52) U.S. Cl.
USPC ................... 523/160; 347/1; 347/85; 347/95; 347/100; 349/108; 427/58; 427/110; 430/4; 430/7; 522/100; 522/102; 522/103; 522/113; 522/114; 522/150; 522/153; 523/161; 524/284; 524/300; 524/306; 524/308; 524/315; 524/317; 524/320; 524/321; 524/366; 524/376; 524/378; 524/543; 524/556; 524/559; 524/560; 524/561; 524/562; 524/578; 525/55; 525/326.1; 525/327.3; 525/327.7

(58) Field of Classification Search
USPC ................. 523/160, 161; 522/100, 102, 103, 522/113, 114, 150, 153; 525/55, 326.1, 327.3, 525/327.7; 347/1, 85, 95, 100; 427/58, 110; 349/108; 430/4, 7; 524/284, 300, 306, 308, 524/315, 317, 320, 321, 366, 376, 378, 543, 524/556, 559, 560, 561, 562, 578
See application file for complete search history.

(56) References Cited

U.S. PATENT DOCUMENTS

| | | |
|---|---|---|
| 5,278,009 A | 1/1994 | Iiada et al. |
| 5,716,739 A | 2/1998 | Kashiwazaki et al. |

(Continued)

FOREIGN PATENT DOCUMENTS

| | | |
|---|---|---|
| CN | 1281151 | 1/2001 |
| CN | 1786089 A | 6/2006 |

(Continued)

OTHER PUBLICATIONS

International Search Report and Written Opinion in counterpart International Application No. PCT/KR2007/007039, mailed on Jul. 14, 2008.

*Primary Examiner* — Patrick Niland
(74) *Attorney, Agent, or Firm* — Summa, Additon & Ashe, P.A.

(57) ABSTRACT

Disclosed is a color filter ink composition that includes an acrylic-based copolymer resin including repeating units represented by a particular chemical formula, a polymerizable monomer, a pigment, and a solvent. According to the present invention, the color filter ink composition can have excellent ejection properties and ejection stability by using a new acrylic-based copolymer resin as a binder resin, and also can have excellent storage stability, so that it can be used for a long period. In addition, a pattern formed using the color filter ink composition can have improved heat resistance, chemical resistance, and film strength.

10 Claims, No Drawings

(56) References Cited

U.S. PATENT DOCUMENTS

| | | |
|---|---|---|
| 5,811,209 A | 9/1998 | Eida et al. |
| 5,922,401 A | 7/1999 | Kashiwazaki et al. |
| 7,820,735 B2 | 10/2010 | Kang et al. |
| 2002/0128351 A1 | 9/2002 | Kiguchi et al. |
| 2006/0128832 A1 | 6/2006 | Kang et al. |
| 2007/0160776 A1* | 7/2007 | Kwon et al. .................. 428/1.1 |

FOREIGN PATENT DOCUMENTS

| | | |
|---|---|---|
| EP | 0628599 A1 | 12/1994 |
| EP | 0704722 A2 | 4/1996 |
| EP | 0725315 A2 | 8/1996 |
| JP | 11-002716 A | 1/1999 |
| KR | 10-1992-7002502 | 9/1992 |
| KR | 10-1993-7000858 | 3/1993 |
| KR | 10-1994-0005617 B1 | 6/1994 |
| KR | 10-1995-7000359 | 1/1995 |
| KR | 10-1995-0011163 B1 | 9/1995 |
| KR | 10-1995-7003746 | 9/1995 |
| KR | 10-1996-0011513 | 4/1996 |
| KR | 10-1996-0029904 | 8/1996 |
| KR | 10-2006-0087801 A | 8/2006 |
| WO | 2009/051293 A1 | 4/2009 |

* cited by examiner

INK COMPOSITION FOR COLOR FILTER, METHOD FOR PREPARING A COLOR FILTER USING THE SAME, AND COLOR FILTER

CROSS-REFERENCE TO RELATED APPLICATIONS

This application is a continuation-in-part application of International Application No. PCT/KR2007/007039, filed Dec. 31, 2007, pending, designating the U.S., published as WO 2009/051293, and which is incorporated herein by reference in its entirety, and claims priority to and the benefit therefrom under 35 USC Section 120. This application further claims priority to and the benefit of Korean Patent Application No. 10-2007-0105130 filed in the Korean Intellectual Property Office on Oct. 18, 2007, the entire disclosure of which is also incorporated herein by reference.

FIELD OF THE INVENTION

The present invention relates to an ink composition for a color filter, a method of preparing a color filter, and a color filter using the same.

BACKGROUND OF THE INVENTION

In general, a color filter is used for a liquid crystal display (LCD), an optical filter for a camera, and the like. A color filter can be fabricated by coating a fine region colored with more than three colors on a charge coupled device or a transparent substrate. Colored thin films can be commonly fabricated using dyeing, printing, electrophoretic deposition (EPD), pigment dispersion, and inkjet methods.

Dyeing methods form a colored film by forming an image with a dyeing agent such as a natural photosensitive resin such as gelatin and the like, an amine-modified polyvinyl alcohol, an amine-modified acrylic-based resin, and the like on a substrate, and then dyeing the image with direct dyes. However, the dyeing process may become more complex and lengthy, since it should include resist printing whenever a color needs to be changed to form a multicolored thin film on the same substrate. In addition, commonly used dyes and resins themselves generally can have good color vividness and dispersion but poor light fastness, water resistance, and heat resistance, which are very important characteristics.

Printing methods form a colored thin film by printing an ink prepared by dispersing a pigment into a thermally curable or photocurable resin and curing it with heat or light. This method may decrease material costs compared with other methods, but it can be difficult to form a fine and exact image, and also acquire a uniform thin film layer. Korean laid-open patent Nos. 95-703746 and 96-11513 disclose a method of making a color filter in an inkjet method. However, these methods also have the same problems of deteriorated durability and heat resistance as dyeing methods, since these methods also use a dye-type color resist composition dispersed from a nozzle to accomplish fine and precise color printing.

Korean laid-open patent Nos. 93-7000858 and 96-29904 disclose electrophoretic deposition (EPD) using an electric precipitation method. The electrophoretic deposition (EPD) can form a precise colored film that has excellent heat resistance and light fastness of the colored film, since it includes a pigment. However, when a finer electrode pattern is needed for a more sophisticated pixel in the future, it may be difficult to use electrophoretic deposition to make the same since a colored film may be stained or thicker at both ends due to electrical resistance.

Pigment dispersion methods form a colored film by repeating a series of processes such as coating, exposing to light, developing, and curing a photopolymer composition including a coloring agent on a transparent substrate with a black matrix. Pigment dispersion methods can improve heat resistance and durability, which are very important characteristics of a color filter, and uniformly maintain the thickness of the film. In addition, pigment dispersion methods are generally used since it is not only easy to apply but can also accomplish a fine pattern. As examples, Korean laid-open patent Nos. 92-7002502 and 95-7000359 and Korean patent publication Nos. 94-5617 and 95-11163 disclose a method of making a color resist using a pigment dispersion method.

However, it can be difficult to manage yield rate using pigment dispersion methods, since each color of red (R), green (G), and blue (B) respectively requires coating, exposure, development, and curing to form a pixel, which makes the whole process line longer and increases control factors among the processes. In addition, as electronic products, such as monitors, TVs, and the like, require a high color resolution rate and a high contrast ratio, pigment dispersion methods may exhibit several problems such as increasing the thickness of a coating layer and the like.

Accordingly, conventional pigment dispersion methods have recently been replaced with several new methods, such as inkjet printing methods. Inkjet printing methods form a light proof layer such as a black matrix and the like on a glass substrate and implants ink in the pixel space. This method does not require processes such as coating, exposure, development, and the like, and can thereby decrease necessary materials required for the processes and simplify the whole process line.

Inkjet methods should form a color layer among pixels to have uniform and excellent color characteristics. Accordingly, a nozzle should not be clogged when ink is dispersed from its head. Further, the ink should be dispersed with the same amount and the same number of drops inside a pixel. The dispersion performance critically depends on interaction between the surface of the head nozzle and the color ink. In addition, when the ink is ejected, it should be prevented from overflowing into the opening of neighboring pixels and contaminating them.

Furthermore, when a pattern is formed in the inkjet method, it should have the same reliability as in a pigment dispersion method. It should also have heat resistance, chemical resistance, film strength, storage stability, and the like. When the pattern does not satisfy these characteristics, it may cause a problem of color change, damage, and the like during post-processing of a color filter.

SUMMARY OF THE INVENTION

An exemplary embodiment of the present invention provides a color filter ink composition. The color filter ink composition of the present invention can have excellent ejection properties, since it does not clog a nozzle during the dispersion or printing, and also can have excellent heat resistance, chemical resistance, film strength or hardness, storage stability, and close-contacting property of a pattern prepared using the same.

Another embodiment of the present invention provides a method of making the color filter ink composition.

A further embodiment of the present invention provides a color filter made from the ink composition.

The embodiments of the present invention are not limited to the above technical purposes, and a person of ordinary skill in the art can understand other technical purposes.

According to one embodiment of the present invention, provided is a color filter ink composition that includes an acrylic-based copolymer resin including repeating units represented by the following Formulae 1 to 3, a polymerizable monomer, a pigment, and a solvent.

[Chemical Formula 1]

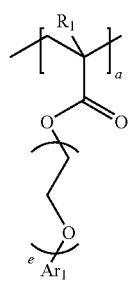

[Chemical Formula 2]

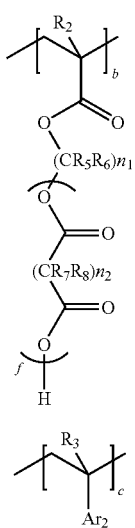

[Chemical Formula 3]

In the above Formulae 1 to 3, $R_1$ to $R_3$ and $R_5$ to $R_8$ are the same or independently selected from the group consisting of hydrogen and substituted or unsubstituted linear or branched alkyl, $Ar_1$ and $Ar_2$ are the same or independently selected from the group consisting of substituted or unsubstituted aryl and substituted or unsubstituted heteroaryl, $n_1$ and $n_2$ are the same or independently an integer ranging from 1 to 5, e is an integer ranging from 1 to 10, f is an integer ranging from 1 to 5, and a, b, and c are mole ratios of repeating units in a numerical range of 1 to 50.

Another embodiment of the present invention provides a method of making a color filter that includes coating the above color filter ink composition on a substrate using an inkjet spray method to form a pattern, and curing the pattern.

Another embodiment of the present invention provides a color filter fabricated using the color filter ink composition.

Hereinafter, further embodiments of the present invention will be described in detail.

The color filter ink composition according to an embodiment of the present invention includes a novel acrylic-based copolymer resin as a binder resin, and can thereby provide excellent ejection properties, ejection stability, and storage stability, so that it can be used for a long period. In addition, when the color filter ink composition is formed into a pattern, the pattern can have improved heat resistance, chemical resistance, and film strength.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Hereinafter, the components of a color filter ink composition according to one embodiment of the present invention are illustrated in detail.

[A] Acrylic-Based Copolymer Resin

The acrylic-based copolymer resin is a copolymer resin including repeating units represented by the following Formulae 1 to 3:

[Chemical Formula 1]

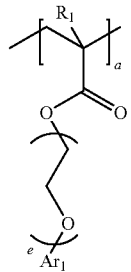

[Chemical Formula 2]

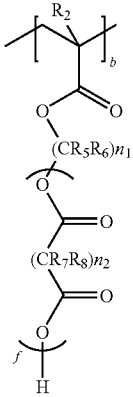

[Chemical Formula 3]

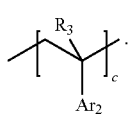

In the above Formulae 1 to 3, $R_1$ to $R_3$ and $R_5$ to $R_8$ are the same or independently selected from the group consisting of hydrogen and substituted or unsubstituted linear or branched alkyl, for example, hydrogen or —$CH_3$, $Ar_1$ and $Ar_2$ are the same or independently selected from the group consisting of substituted or unsubstituted aryl and substituted or unsubstituted heteroaryl, for example, $Ar_1$ and $Ar_2$ are the same or independently selected from the group consisting of substituted or unsubstituted $C_6$ to $C_{10}$ aryl and substituted or unsubstituted $C_5$ to $C_9$ heteroaryl, wherein the substituted aryl and substituted heteroaryl can include a substituent selected from the group consisting of H, —$CH_3$, and —$OC(CH_3)_3$, $n_1$ and $n_2$ are the same or independently an integer ranging from 1 to 5, e is an integer ranging from 1 to 10, f is an integer ranging from 1 to 5, and a, b, and c are mole ratios of repeating units in a numerical range of 1 to 50.

The acrylic-based copolymer resin may further include a repeating unit represented by the following Formula 4.

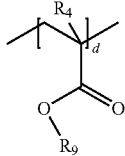

[Chemical Formula 4]

In the above Formula 4, $R_4$ is selected from the group consisting of hydrogen and substituted or unsubstituted linear or branched alkyl, $R_9$ is selected from the group consisting of substituted or unsubstituted linear or branched alkyl, for example, alkyl substituted with alkoxy or aryl, substituted or unsubstituted cycloalkyl, for example, biscyclopentanyl, substituted or unsubstituted heterocycloalkyl, norbornyl

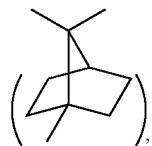

substituted or unsubstituted alcohol, for example, a primary alcohol or a secondary alcohol, substituted or unsubstituted alkylether, and glycidyl; and d is 0.1 to 50 mol % based on the acrylic-based copolymer, for example 1 to 45 mol %.

Examples of $R_9$ include without limitation —$CH_3$, —$C_2H_5$, —$C_4H_9$, —$(CH_2)_3CH_3$, —$CH_2CH(CH_3)_2$, —$C(CH_3)_3$, —$CH_2CH(C_2H_5)C_4H_9$, —$CH_2CH(CH_3)CH_2CH(CH_3)CH_2CH(CH_3)_2$, —$C_{12}H_{25}$, —$C_{13}H_{27}$, —$C_{14}H_{29}$, —$C_{15}H_{31}$, —$C_{16}H_{33}$, —$C_{17}H_{35}$, —$C_{18}H_{37}$, —$C_2H_4OC_4H_9$, —$(CH_2CH_2O)_2C_4H_9$, —$(CH_2CH_2O)_3CH_3$, —$(CH_2CH_2O)_9CH_3$,

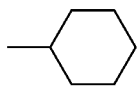 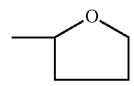 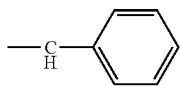

norbornyl, biscyclopentanyl, —$CH_2CH_2OH$, —$CH_2CH(OH)CH_3$, —$CH_2CH(OH)CH_3$, —$CH_2CH(OH)CH_2CH_3$, glycidyl, or combinations thereof.

In the present specification, unless another specific definition is otherwise provided, the term "substituted" refers to one substituted with at least one or more substituents selected from the group consisting of hydroxy, halogen, substituted or unsubstituted linear or branched alkyl, substituted or unsubstituted cycloalkyl, substituted or unsubstituted heterocloalkyl, substituted or unsubstituted alkoxy, substituted or unsubstituted aryl, substituted or unsubstituted heteroaryl, and substituted or unsubstituted alkenyl, and can be selected from the group consisting of substituted or unsubstituted linear or branched alkyl, substituted or unsubstituted aryl, substituted or unsubstituted heterocycloalkyl, and substituted or unsubstituted alkoxy.

In the present specification, unless another specific definition is otherwise provided, the term "alkyl" refers to $C_1$ to $C_{30}$ alkyl, for example $C_1$ to $C_{18}$ alkyl, the term "cycloalkyl" refers to $C_3$ to $C_{20}$ cycloalkyl, for example $C_3$ to $C_{10}$ cycloalkyl, the term "heterocycloalkyl" refers to $C_2$ to $C_{20}$ heterocycloalkyl, for example $C_2$ to $C_{10}$ heterocycloalkyl, the term "alkoxy" refers to $C_1$ to $C_{20}$ alkoxy, for example $C_1$ to $C_{10}$ alkoxy, and as another example $C_1$ to $C_4$ alkoxy, the term "aryl" refers to $C_6$ to $C_{40}$ aryl, for example $C_6$ to $C_{20}$ aryl, the term "heteroaryl" refers to $C_2$ to $C_{30}$ heteroaryl, for example $C_2$ to $C_{18}$ heteroaryl, the term "alkenyl" refers to $C_2$ to $C_{20}$ alkenyl, for example $C_2$ to $C_{10}$ alkenyl, the term "alcohol" refers to $C_1$ to $C_{20}$ alcohol, for example $C_1$ to $C_{10}$ alcohol, and as another example $C_1$ to $C_5$ lower alcohol, and the term "alkylether" refers to $C_2$ to $C_{20}$ alkylether, for example $C_2$ to $C_{10}$ alkylether.

In the present specification, unless another specific definition is otherwise provided, the terms "heterocycloalkyl" or "heteroaryl" refer to cycloalkyl and aryl including 1 to 20, for example 1 to 15, and as another example 1 to 5, heteroatoms selected from the group consisting of N, O, S, and Si.

The acrylic-based copolymer resin, which includes repeating units represented by the above Formulae 1 to 3, and selectively a repeating unit represented by Chemical Formula 4, has no copolymer limit, and can be, for example, a block copolymer including regularly repeated repeating units or a random copolymer including randomly repeated repeating units.

In addition, the acrylic-based copolymer resin, which includes repeating units represented by the above Formulae 1 to 3, and selectively a repeating unit represented by Chemical Formula 4, can be prepared in addition polymerization by radical initiation of a styrene-based compound or an acrylic-based compound.

Examples of the styrene-based compound or acrylic-based compound include without limitation styrene, 4-methyl styrene, 4-butoxy styrene, 1-methyl styrene, 1-methyl 4'-methyl styrene, 1-methyl 4'-butoxy styrene, methyl acrylate, ethyl acrylate, n-butyl acrylate, iso-butyl acrylate, t-butyl acrylate, 2-ethyl hexyl acrylate, isodecyl acrylate, n-lauryl acrylate, n-tridecyl acrylate, myristyl acrylate, pentadecyl acrylate, cesyl acrylate heptadecyl acrylate, stearyl acrylate, n-butoxy ethyl acrylate, butoxy diethyleneglycol acrylate, methoxy triethyleneglycol acrylate, methoxy nonylethyleneglycol acrylate, cyclohexyl acrylate, tetrahydrofurfuryl acrylate, benzyl acrylate, isobonyl acrylate, 2-hydroxyethyl acrylate, 2-hydroxypropyl acrylate, 2-hydroxybutyl acrylate, glycidyl acrylate, methyl methacrylate, ethyl methacrylate, n-butyl methacrylate, isobutyl methacrylate, t-butyl methacrylate, 2-ethyl hexyl methacrylate, isodecyl methacrylate, n-lauryl methacrylate, n-tridecyl methacrylate, myristyl methacrylate, pentadecyl methacrylate, cesyl methacrylate, heptadecyl methacrylate, stearyl methacrylate, n-butoxy ethyl methacrylate, butoxy diethyleneglycol methacrylate, methoxy triethyleneglycol methacrylate, methoxy nonylethyleneglycol methacrylate, cyclohexyl methacrylate, tetrahydrofurfuryl methacrylate, benzyl methacrylate, isobonyl methacrylate, 2-hydroxyethyl methacrylate, 2-hydroxypropyl methacrylate, 2-hydroxybutyl methacrylate, glycidyl methacrylate, 2-acryloyl, oxyethyl succinic acid, 2-acryloyldioxyethyl succinic acid, 2-acryloyltrioxyethyl succinic acid, 2-acryloyltetraoxyethyl succinic acid, 2-acryloylpentaoxyethyl succinic acid, 2-methacryloyloxyethyl succinic acid, 2-methacryloyldioxyethyl succinic acid, 2-methacryloyltrioxyethyl succinic acid, 2-methacryloyltetraoxyethyl succinic acid, 2-methacryloylpentaoxyethyl succinic acid, 2-phenoxy ethyl acrylate, 2-phenoxy diethyleneglycol acrylate, 2-phenoxy triethyleneglycol acrylate, 2-phenoxy tetraethyleneglycol acrylate, 2-phenoxy pentaethyleneglycol acrylate, 2-phenoxy hexaethyleneglycol acrylate, 2-phenoxy heptaethyleneglycol acrylate, 2-phenoxy octaethyleneglycol acrylate, 2-phenoxy nonaethyleneglycol acrylate, 2-phenoxy decaethyleneglycol acrylate, 2-phenoxy ethyl methacrylate, 2-phenoxy diethyleneglycol methacrylate, 2-phenoxy triethyleneglycol methacrylate, 2-phenoxy tetraethyleneglycol methacrylate, 2-phenoxy pentaethyleneglycol methacrylate, 2-phenoxy hexaethyleneglycol methacrylate, 2-phenoxy heptaethyleneglycol methacrylate, 2-phenoxy octaethyleneglycol methacrylate, 2-phenoxy nonaethyleneglycol methacrylate, 2-phenoxy decaethyleneglycol methacrylate, 2-phenoxy ethyl acrylate, 2-phenoxy diethyleneglycol acrylate, 2-phenoxy triethyleneglycol acrylate, 2-phenoxy tetraethyleneglycol acrylate, 2-phenoxy pentaethyleneglycol acrylate, 2-phenoxy hexaethyleneglycol acrylate, 2-phenoxy heptaethyleneglycol acrylate, 2-phenoxy octaethyleneglycol acrylate, 2-phenoxy nonaethyleneglycol acrylate, 2-phenoxy decaethyleneglycol acrylate, 2-phenoxy ethyl methacrylate, 2-phenoxy diethyleneglycol methacrylate, 2-phenoxy triethyleneglycol methacrylate, 2-phenoxy tetraethyleneglycol methacrylate, 2-phenoxy pentaethyleneglycol methacrylate, 2-phenoxy hexaethyleneglycol methacrylate, 2-phenoxy heptaethyleneglycol methacrylate, 2-phenoxy octaethyleneglycol methacrylate, 2-phenoxy nonaethyleneglycol methacrylate, 2-phenoxy decaethyleneglycol methacrylate, 2-(t-butyl)phenoxy ethyl acrylate, 2-(t-butyl)phenoxy diethyleneglycol acrylate, 2-(t-butyl)phenoxy triethyleneglycol acrylate, 2-(t-butyl)phenoxy tetraethyleneglycol acrylate, 2-(t-butyl)phenoxy pentaethyleneglycol acrylate, 2-(t-butyl)phenoxy hexaethyleneglycol acrylate, 2-(t-butyl)phenoxy heptaethyleneglycol acrylate, 2-(t-butyl)phenoxy octaethyleneglycol acrylate, 2-(t-butyl)phenoxy nonaethyleneglycol acrylate, 2-(t-butyl)phenoxy decaethyleneglycol acrylate, 2-(t-butyl)phenoxy ethyl methacrylate, 2-(t-butyl)phenoxy diethyleneglycol methacrylate, 2-(t-butyl)phenoxy triethyleneglycol methacrylate, 2-(t-butyl)phenoxy tetraethyleneglycol methacrylate, 2-(t-butyl)phenoxy pentaethyleneglycol methacrylate, 2-(t-butyl)phenoxy hexaethyleneglycol methacrylate, 2-(t-butyl)phenoxy heptaethyleneglycol methacrylate, 2-(t-butyl)phenoxy octaethyleneglycol methacrylate, 2-(t-butyl)phenoxy nonaethyleneglycol methacrylate, 2-(t-butyl)phenoxy decaethyleneglycol methacrylate, and combinations thereof.

The acrylic-based copolymer resin may have a weight average molecular weight (Mw) ranging from 3000 to 15,000. In another embodiment, it may have a weight average molecular weight ranging from 5000 to 10,000. When the acrylic-based copolymer resin has a weight average molecular weight of less than 3000, it may bring about a problem of a slow curing rate and a non-uniform coating surface. However, when the acrylic-based copolymer resin has a weight average molecular weight of over 15,000, it may have too high a viscosity to be uniformly coated.

In addition, the acrylic-based copolymer resin may have an acid value of less than 100 KOHmg/g. In another embodiment, it may have an acid value ranging from 10 to 100 KOHmg/g. When the acrylic-based copolymer resin has an acid value within this range, the ink composition may have excellent developability and improved stability.

The color filter ink composition may include the acrylic-based copolymer resin in an amount ranging from 1 to 40 wt % based on the total weight of the color filter ink composition. When the acrylic-based copolymer resin is included in an amount of less than less than 1 wt %, the ink composition may not be coated in a uniform thickness or be strongly adhered to a substrate, which can deteriorate a color filter post-process such as film strength, heat resistance, chemical resistance, after-image, and the like. When the acrylic-based copolymer resin is included in an amount of more than 40 wt %, it may increase viscosity of an ink composition, so that the ink composition may clog a nozzle and not be uniformly ejected.

[B] Polymerizable Monomer

The polymerizable monomer can be a monomer generally used in a color filter photosensitive resin composition, such as but not limited to dipentaerythrytol hexaacrylate, ethylene glycol diacrylate, triethylene glycol diacrylate, 1,4-butanediol diacrylate, 1,6-hexanediol diacrylate, neopentylglycol diacrylate, pentaerythrytol diacrylate, pentaerythrytol triacrylate, dipentaerythrytol diacrylate, dipentaerythrytol triacrylate, dipentaerythrytol pentaacrylate, pentaerythrytol hexaacrylate, bisphenol A diacrylate, trimethylolpropane triacrylate, novolace poxyacrylate, ethylene glycol dimethacrylate, diethylene glycol dimethacrylate, triethylene glycol dimethacrylate, propylene glycol dimethacrylate, 1,4-butanediol dimethacrylate, 1,6-hexanediol dimethacrylate, and the like, and combinations thereof.

The color filter ink composition may include the polymerizable monomer in an amount of 1 to 20 wt % based on the total weight of the color filter ink composition. When the polymerizable monomer is included in an amount of less than 1 wt %, it may cause a film to not be sufficiently cured after pattern formation, which can deteriorate film strength. When the polymerizable monomer is included in an amount of more than 20 wt %, it may cause a film to excessively shrink, and thereby detach from a black matrix, which can deteriorate reliability of a color filter post-process. It may also increase viscosity of an ink composition and thereby deteriorate storage stability. As a result, the ink composition may not have satisfactory ink characteristics.

[C] Pigment

The pigment may be selected from the group consisting of organic pigments, inorganic pigments, and combinations thereof.

Examples of the organic pigment may include without limitation anthraquinone-based pigments, condensed polycyclic pigments such as perylene-based pigments and the like, phthalocyanine pigments, azo-based pigments, and combinations thereof.

The organic pigment may include a color compound classified into a pigment in a color index. Examples of the color compounds may include without limitation C.I. pigment yellow No. 1, C.I. pigment yellow No. 12, C.I. pigment yellow No. 13, C.I. pigment yellow No. 14, C.I. pigment yellow No. 15, C.I. pigment yellow No. 16, C.I. pigment yellow No. 17, C.I. pigment yellow No. 20, C.I. pigment yellow No. 24, C.I. pigment yellow No. 31, C.I. pigment yellow No. 53, C.I. pigment yellow No. 83, C.I. pigment yellow No. 86, C.I. pigment yellow No. 93, C.I. pigment yellow No. 94, C.I. pigment yellow No. 109, C.I. pigment yellow No. 110, C.I. pigment yellow No. 117, C.I. pigment yellow No. 125, C.I. pigment yellow No. 128, C.I. pigment yellow No. 137, C.I. pigment yellow No. 138, C.I. pigment yellow No. 139, C.I. pigment yellow No. 147, C.I. pigment yellow No. 148, C.I. pigment yellow No. 150, C.I. pigment yellow No. 153, C.I.

pigment yellow No. 154, C.I. pigment yellow No. 166, C.I. pigment yellow No. 173, C.I. pigment orange No. 13, C.I. pigment orange No. 31, C.I. pigment orange No. 36, C.I. pigment orange No. 38, C.I. pigment orange No. 40, C.I. pigment orange No. 42, C.I. pigment orange No. 43, C.I. pigment orange No. 51, C.I. pigment orange No. 55, C.I. pigment orange No. 59, C.I. pigment orange No. 61, C.I. pigment orange No. 64, C.I. pigment orange No. 65, C.I. pigment orange No. 71, C.I. pigment orange No. 73, C.I. pigment red No. 9, C.I. pigment red No. 97, C.I. pigment red No. 105, C.I. pigment red No. 122, C.I. pigment red No. 123, C.I. pigment red No. 144, C.I. pigment red No. 149, C.I. pigment red No. 166, C.I. pigment red No. 168, C.I. pigment red No. 176, C.I. pigment red No. 177, C.I. pigment red No. 180, C.I. pigment red No. 192, C.I. pigment red No. 215, C.I. pigment red No. 216, C.I. pigment red No. 224, C.I. pigment red No. 242, C.I. pigment red No. 254, C.I. pigment red No. 264, C.I. pigment red No. 265, C.I. pigment blue No. 15, C.I. pigment blue No. 15:3, C.I. pigment blue No. 15:4, C.I. pigment blue No. 15:6, C.I. pigment blue No. 60, C.I. pigment purple No. 1, C.I. pigment purple No. 19, C.I. pigment purple No. 23, C.I pigment purple No. 29, C.I pigment purple No. 32, C.I pigment purple No. 36, C.I pigment purple No. 38, C.I. pigment green No. 7, C.I. pigment green No. 36, C.I. pigment brown No. 23, C.I. pigment brown No. 25, and the like. These organic pigments can be used singularly or as a combination of two or more.

Examples of the inorganic pigments may include without limitation titanium oxide, titanium black, carbon black, and combinations thereof.

The pigment should have high transmittance and a high contrast ratio. In addition, it should have a small particle size and a small particle size distribution. However, when its particle has too small an average diameter, it may deteriorate dispersibility. Accordingly, it should have an average particle diameter ranging from 0.01 to 0.5 µm, but is not limited thereto.

The color filter ink composition can include the pigment in an amount of 1 to 40 wt %, for example 5 to 20 wt %, based on the total weight of the color filter ink composition. When the pigment is included in an amount of less than 1 wt %, it may not accomplish desired color reproducibility. When the pigment is included in an amount of more than 40 wt %, it may sharply deteriorate the pattern-curing characteristic and adherence to a substrate.

In addition, the pigment can be dispersed into a solvent to prepare a pigment dispersion solution and can then be mixed with a color filter ink composition. The pigment dispersion solution can be prepared according to any suitable conventional methods known in the art, and the skilled artisan will appreciate and understand how to prepare a pigment dispersion solution for use in the present invention without undue experimentation.

[D] Solvent

The solvent may include any solvent, as long as it has high dissolubility for an acrylic-based copolymer resin and excellent affinity for the pigment dispersion solution, and can thereby maintain high dispersibility. In exemplary embodiments, the solvent can be a high boiling-point solvent. The high boiling-point solvent may prevent a nozzle from being clogged during the printing, thereby securing the color characteristic of a color filter.

The high boiling-point solvent may have a boiling point ranging from 170 to 250° C., but is not limited thereto.

The high boiling-point solvent can be selected from the group consisting of 3-methoxy butyl acetate, diethylene glycol methyl ether acetate, diethylene glycol ethyl ether acetate, diethylene glycol butyl ether acetate, ethylene glycol butyl ether acetate, 1,3-butanediol diacetate, propylene glycol n-propyl ether acetate, propylene glycol n-butyl ether acetate, dipropylene glycol n-propyl ether acetate, dipropylene glycol n-butyl ether acetate, propylene glycol diacetate, dipropylene glycol propyl ether, dipropylene glycol butyl ether, tripropylene glycol methyl ether, diethylene glycol dibutyl ether, tripropylene glycol butyl ether, and combinations thereof.

In addition, the solvent can be prepared by mixing a solvent with a boiling point of lower than 170° C. with the high boiling-point solvent in order to improve color reproducibility, contrast ratio, and storage stability required for a color filter.

The low boiling-point solvent can be selected from the group consisting of ethylacetate, n-butylacetate, isobutylacetate, isopropylacetate, n-propylacetate, propylene glycol methyl ether acetate, propylene glycol ethyl ether acetate, 3-methoxy-1-propyl acetate, ethylene glycol methyl ether acetate, ethylene glycol ethyl ether acetate, propylene glycol methyl ether, propylene glycol ethyl ether, propylene glycol propyl ether, propylene glycol diacetate, ethylene glycol propyl ether, n-butyl propionate, 3-ethoxy ethyl propionate, n-pentyl propionate, n-propyl propionate, propylene glycol methyl ether propionate, and combinations thereof.

The high boiling-point solvent may be mixed with the low boiling-point solvent in a weight ratio of 99:1 to 50:50. When the high boiling-point solvent is included in an amount lower than this ratio, the solvent may be volatilized too quickly, which can increase the speed at which the ink dries. Accordingly, the nozzle may be more frequently clogged, resulting in deteriorating ejection performance of the ink. When the high boiling-point solvent is included in an amount higher than this ratio, the ink may not be uniformly ejected and it may be difficult to maintain a high contrast ratio due to deteriorated dispersibility and storage stability.

The solvent can be included as a balance. In exemplary embodiments, the solvent can be included in the color filter ink composition in an amount of 40 to 90 wt % based on the total weight of a color filter ink composition. When the solvent is included in an amount of less than 40 wt %, it may sharply deteriorate ejection properties of the ink, so that the ink cannot be printed. When the solvent is included in an amount of more than 90 wt %, the ink may leak from a nozzle, thereby failing to acquire a desired color characteristic after the pattern formation.

[E] Polymerization Initiator

The color filter ink composition may further include a polymerization initiator to improve pattern strength. The polymerization initiator may be selected from the group consisting of photopolymerization initiators, thermal polymerization initiators, and combinations thereof.

Exemplary photopolymerization initiators include without limitation acetophenone-based compounds, benzophenone-based compounds, thioxanthone-based compounds, benzoin-based compounds, triazine-based compounds, and combinations thereof.

Exemplary acetophenone-based compounds include without limitation 2,2'-diethoxyacetophenone, 2,2'-dibutoxyacetophenone, 2-hydroxy-2-methylpropinophenone, p-t-butyltrichloroacetophenone, p-t-butyldichloroacetophenone, 4-chloroacetophenone, 2,2'-dichloro-4-phenoxyacetophenone, 2-methyl-1-(4-(methylthio)phenyl)-2-morpholinopropan-1-one, 2-benzyl-2-dimethylamino-1-(4-morpholinophenyl)-butan-1-one, and the like, and combinations thereof.

Exemplary benzophenone-based compounds include without limitation benzophenone, benzoyl benzoate, benzoyl methyl benzoate, 4-phenyl benzophenone, hydroxy benzophenone, acrylated benzophenone, 4,4'-bis(dimethyl amino)benzophenone, 4,4'-bis(diethylamino)benzophenone, 4,4'-dimethylaminobenzophenone, 4,4'-dichlorobenzophenone, 3,3'-dimethyl-2-methoxybenzophenone, and the like, and combinations thereof.

Exemplary thioxanthone-based compounds include without limitation thioxanthone, 2-crolthioxanthone, 2-methylthioxanthone, isopropyl thioxanthone, 2,4-diethyl thioxanthone, 2,4-diisopropyl thioxanthone, 2-chlorothioxanthone, and the like, and combinations thereof.

Exemplary benzoin-based compounds include without limitation benzoin, benzoin methyl ether, benzoin ethyl ether, benzoin isopropyl ether, benzoin isobutyl ether, benzyldimethylketal, and the like, and combinations thereof.

Exemplary triazine-based compounds include without limitation 2,4,6,-trichloro s-triazine, 2-phenyl4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl4,6-bis(trichloromethyl)-s-triazine, bis(trichloromethyl)-6-styryl-s-triazine, 2-(naphto1-yl)-4,6-bis(trichloromethyl)-s-triazine, 2-(4-methoxynaphto1-yl)-4,6-bis(trichloromethyl)-s-triazine, 2,4-trichloromethyl(piperonyl)-6-triazine, 2,4-trichloromethyl(4'-methoxystyryl)-6-triazine, and the like, and combinations thereof.

The photopolymerization initiator may further include a carbazole-based compound, a diketone-based compound, a sulfonium borate-based compound, a diazo-based compound, a biimidazole-based compound, and the like.

Exemplary thermal polymerization initiators may include without limitation any generally-used peroxide-based compound. Exemplary peroxide-based compounds include without limitation methylethylketone peroxide; methylisobutyl ketone peroxide; cyclohexanone peroxide; acetylacetone peroxide; isobutyryl peroxide; hydroperoxide series compounds such as diisoprobenzene hydroperoxide, cumenehydroperoxide, and t-butylhydroperoxide; and the like, and combinations thereof.

Other exemplary thermal polymerization initiators include without limitation peroxyketal series compounds such as 1,1-di-t-butylperoxy-3,3,5-trimethylcyclohexane, 2,2-di-(t-butyloxyisopropyl)benzene, 4,4-di-t-butylperoxyvaleric acid n-butylester, and the like, and combinations thereof.

The color filter ink composition can include the polymerization initiator in an amount of 0.1 to 10 parts by weight, based on 100 parts by weight of a color filter ink composition. When the initiator is included in an amount of less than 0.1 parts by weight, it may not improve pattern strength. However, when it is included in an amount of more than 10 parts by weight, it may deteriorate storage stability and gradually increase viscosity, which can deteriorate ejection performance.

[F] Other Additives

The color filter ink composition may selectively include one or more additives, such as a dispersing agent to improve dispersion of a pigment.

The dispersing agent may include a non-ionic, anionic, or cationic dispersing agent. Exemplary dispersing agents can include without limitation polyalkylene glycol or esters thereof, polyoxyalkylene, polyhydric alcohol ester alkylene oxide additives, alcoholalkyleneoxide additives, sulfonic acid esters, sulfonates, carboxylic acid esters, carboxylates, aalkylamide alkylene oxide additives, alkylamines, and the like. These dispersing agents can be used singularly or as a combination of two or more. The color filter ink composition may include the dispersing agent in an amount of 10 to 20 parts by weight, based on 100 parts by weight of a pigment.

In addition, the ink composition may further include a silicon-based or fluorine-based coating improving agent to improve coating and defoamability, and also an adherence improving agent to improve its adherence to a substrate. The color filter ink composition may include coating and adherence improving agents in an amount of 0.01 to 1 part by weight, based on 100 parts by weight of the ink composition.

Another embodiment of the present invention provides a method of making a pixel for a display color filter using the color filter ink composition.

The method of making a pixel of a display color filter includes coating the ink composition on a substrate using an inkjet spraying method to form a pattern (S1), and curing the pattern (S2).

Pattern Formation (S1)

The color filter ink composition can be coated to a thickness of 1.0 to 3.0 μm on a substrate in an inkjet dispersion method. According to the inkjet dispersion, a pattern can be formed by repetitively dispersing desired colors one by one or simultaneously dispersing the desired colors to simplify the process.

Curing (S2)

The pattern can then be cured to form a pixel. The curing may include optic curing, thermal curing, or the like. The thermal curing may be performed at a temperature of higher than 200° C.

According to still another embodiment of the present invention, provided is a color filter prepared using the color filter ink composition.

Hereinafter, the present invention is illustrated in more detail with reference to examples. However, they are exemplary embodiments of present invention and are no limiting.

EXAMPLE 1

Preparation of a Color Filter Ink Composition (A) Acrylic-based copolymer resin of Chemical Formula 5: 4 wt %
Weight average molecular weight: 6000
Monomer mole ratio: a/b/c=40/30/30

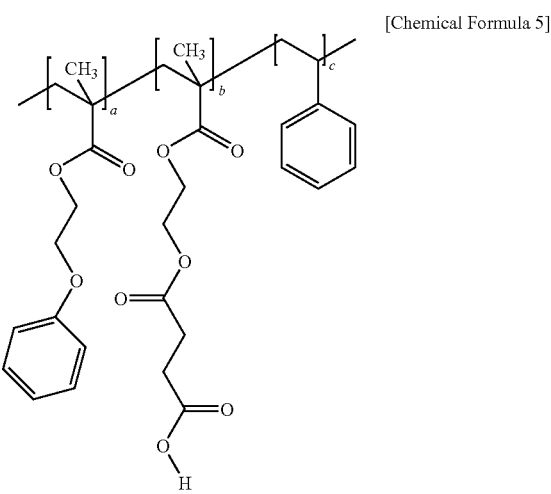

[Chemical Formula 5]

(B) Polymerizable monomer: 4 wt %
Dipentaerythrytol hexaacrylate (C) Pigment: 10 wt %
C.I. pigment red No. 254/C.I. pigment red No. 177=80:20 (weight ratio)
(D) Solvent
Diethylene glycol butyl ether acetate: 52 wt %
Diethylene glycol ethyl ether acetate: 30 wt %
These above components are used to prepare an ink composition.

EXAMPLE 2

Preparation of a Color Filter Ink Composition

An ink composition is prepared according to the same method as Example 1, except for using an acrylic-based copolymer resin of the following Formula 6 instead of an acrylic-based copolymer resin of Chemical Formula 5.
(A) Acrylic-based copolymer resin of Chemical Formula 6: 4 wt %
Weight average molecular weight: 6000
Monomer mole ratio: a/b/c/d=30/20/20/30

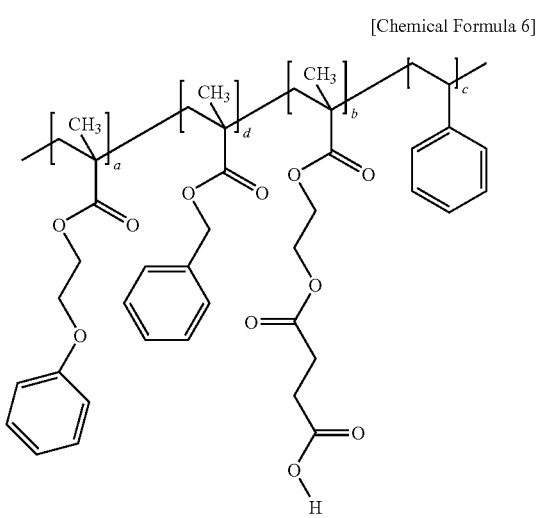

[Chemical Formula 6]

EXAMPLE 3

Preparation of a Color Filter Ink Composition

An ink composition Example 3 is prepared according to the same method as Example 2, except for using 62 wt % of diethylene glycol butylether acetate and 20 wt % of propylene glycol methyl ether acetate instead of the solvent of Example 2.

EXAMPLE 4

Preparation of a Color Filter Ink Composition

An ink composition is prepared according to the same method as Example 3, except for using 10 wt % of C.I. pigment green No. 36 and C.I. pigment yellow No. 150 mixed in a weight ratio of 75:25 instead of the pigment of Example 3.

EXAMPLE 5

Preparation of a Color Filter Ink Composition

An ink composition is prepared according to the same method as Example 3, except for using 10 wt % of C.I. pigment blue No. 156 and C.I. pigment purple No. 23 mixed in a weight ratio of 90:10 instead of a pigment (C) of Example 3.

EXAMPLE 6

Preparation of a Color Filter Ink Composition (A) Acrylic-based copolymer resin of Chemical Formula 7: 2 wt %
Weight average molecular weight: 6000
Monomer mole ratio: a:b:c:d=30:10:20:40

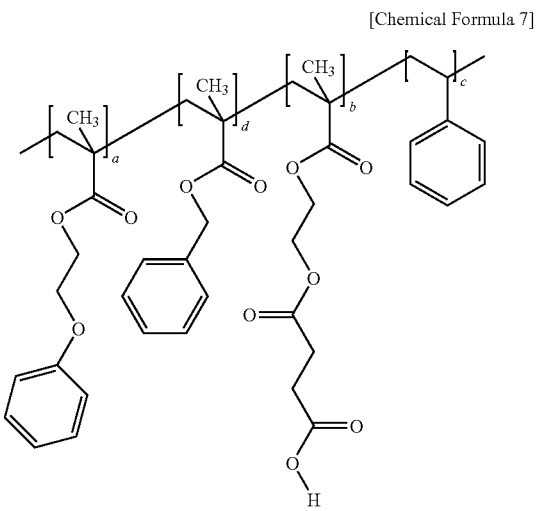

[Chemical Formula 7]

(B) Polymerizable monomer: 5.5 wt %
Dipentaerythrytolhexaacrylate
(C) Pigment: 10 wt %
C.I. pigment red No. 254: C.I. pigment red No. 177=80:20 (weight ratio)
(D) Solvent
Diethylene glycol butyl ether acetate: 52 wt %
Diethylene glycol ethyl ether acetate: 30 wt %
(E) Polymerization initiator: 0.5 wt %
TAZ-110 (Midori Chemical Co., Ltd.)
The above components are used to prepare an ink composition.

EXAMPLE 7

Preparation of a Color Filter Ink Composition

An ink composition is prepared according to the same method as Example 6, except for using 62 wt % of diethylene glycol butyl ether acetate and 20 wt % of propylene glycol methyl ether acetate instead of the solvent (D) of Example 6.

EXAMPLE 8

Preparation of a Color Filter Ink Composition

An ink composition is prepared according to the same method as Example 7, except for an acrylic-based copolymer resin of the following Formula 8 instead of the acrylic-based copolymer resin of Example 7.

(A) Acrylic-based copolymer resin of Chemical Formula 8: 4 wt %

Weight average molecular weight: 8000

Monomer mole ratio: a:b:c:d=40:10:20:30

[Chemical Formula 8]

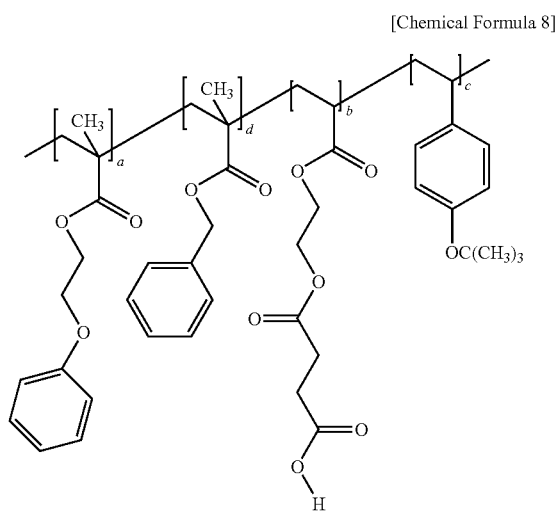

EXAMPLE 9

Preparation of a Color Filter Ink Composition

An ink composition is prepared according to the same method as Example 6, except for an acrylic-based copolymer resin of the following Formula 9 instead of the acrylic-based copolymer resin of Example 6.

(A) Acrylic-based copolymer resin of Chemical Formula 9: 4 wt %

Weight average molecular weight: 8500

Monomer mole ratio: a:b:c:d=40:10:20:30

[Chemical Formula 9]

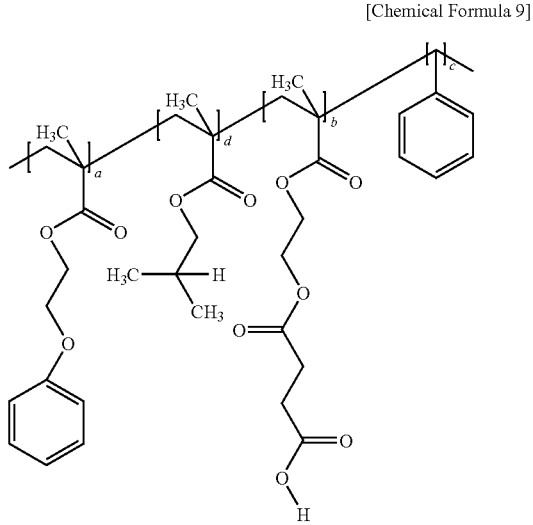

EXAMPLE 10

Preparation of a Color Filter Ink Composition

An ink composition is prepared according to the same method as Example 6, except for an acrylic-based copolymer resin of the following Formula 10 instead of the acrylic-based copolymer resin of Example 6.

(A) Acrylic-based copolymer resin of Chemical Formula 10: 4 wt %

Weight average molecular weight: 8000

Monomer mole ratio: a:b:c:d=40:10:20:30

[Chemical Formula 10]

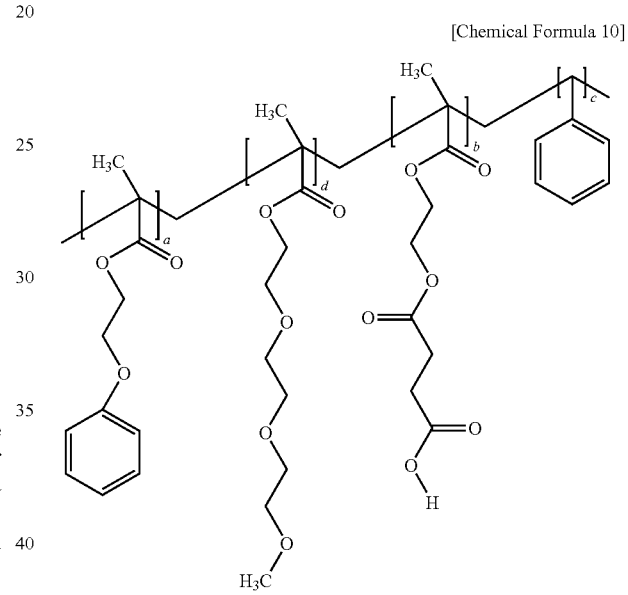

EXAMPLE 11

Preparation of a Color Filter Ink Composition

An ink composition is prepared according to the same method as Example 6, except for an acrylic-based copolymer resin of the following Formula 11 instead of the acrylic-based copolymer resin of Example 6.

(A) Acrylic-based copolymer resin of Chemical Formula 11: 4 wt %

Weight average molecular weight: 9000

Monomer mole ratio: a:b:c:d=40:10:20:30

[Chemical Formula 11]

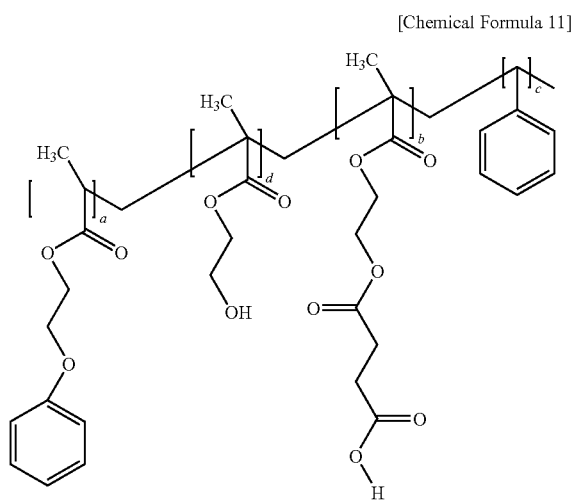

EXAMPLE 12

Preparation of a Color Filter Ink Composition

An ink composition is prepared according to the same method as Example 6, except for an acrylic-based copolymer resin of the following Formula 12 instead of the acrylic-based copolymer resin of Example 6.

(A) Acrylic-based copolymer resin of Chemical Formula 12: 4 wt %
Weight average molecular weight: 8500
Monomer mole ratio: a:b:c:d=40:10:20:30

[Chemical Formula 12]

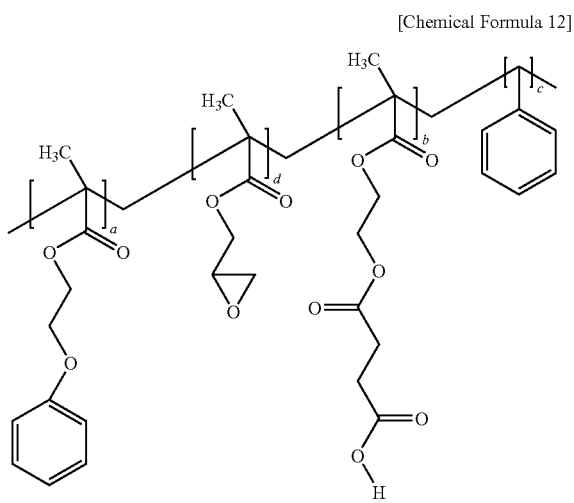

EXAMPLE 13

Preparation of a Color Filter Ink Composition

An ink composition is prepared according to the same method as Example 6, except for an acrylic-based copolymer resin of the following Formula 13 instead of the acrylic-based copolymer resin of Example 6.

(A) Acrylic-based copolymer resin of Chemical Formula 13: 4 wt %
Weight average molecular weight: 8500
Monomer mole ratio: a:b:c:d=40:10:20:30

[Chemical Formula 13]

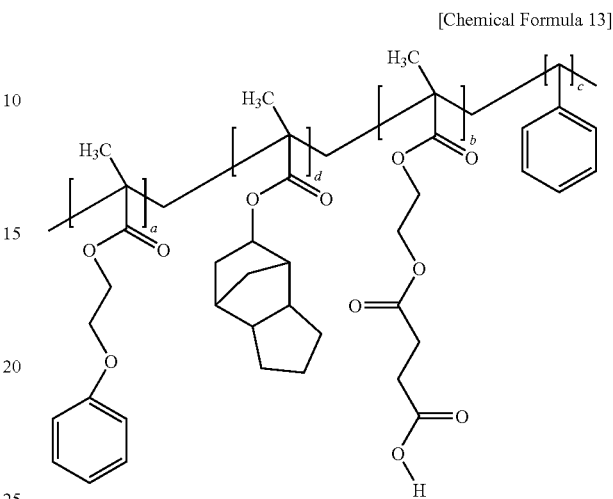

COMPARATIVE EXAMPLE 1

Preparation of a Color Filter Ink Composition

An ink composition is prepared according to the same as Example 1, except for using 4 wt % of benzyl methacrylate/cyclohexyl methacrylate/methacrylic acid copolymer mixed in a monomer mole ratio of 40:40:20 and having a weight average molecular weight of 30,000 instead of the acrylic-based copolymer resin of Chemical Formula 6 according to Example 2.

COMPARATIVE EXAMPLE 2

Preparation of a Color Filter Ink Composition

An ink composition is prepared according to the same as Example 1, except for using 4 wt % of benzyl methacrylate/cyclohexyl methacrylate/glycidyl methacrylate/methacrylic acid copolymer mixed in a monomer mole ratio of 30:30:20:20 and having a weight average molecular weight of 22,000 instead of the acrylic-based copolymer resin of Chemical Formula 6 according to Example 2.

Property Evaluation of Color Filter Ink Compositions

The properties of color filter ink compositions according to Examples 1 to 13 and Comparative Examples 1 and 2 are evaluated as follows.

(1) Evaluation of Ejection Properties

The color filter ink compositions of Examples 1 to 13 and Comparative Examples 1 and 2 are measured in a droplet size of 20 pL on a paper, and then ejected through all the nozzles three times. Then, their ejection amounts are measured, and the wetness degree around the nozzle is evaluated. The results are shown in the following Table 1.

As used herein, ⊚ denotes an average ejection amount of 20±0.3 pL and less than 2 wet nozzles; ○ denotes an average ejection amount of 20±0.5 pL and less than 4 wet nozzles; Δ denotes an average ejection amount of 20±0.7 pL and less than 6 wet nozzles; and x denotes an average ejection amount of more than 20±0.7 pL.

(2) Evaluation of Long Ejection Properties

The color filter ink compositions of Examples 1 to 13 and Comparative Examples 1 and 2 are dispersed once, and after the passage of 10 seconds they are dispersed twice and 20 seconds is allowed to elapse, to form a droplet size of 20 pL on paper. Then, the waiting times are progressively increased and the droplets are examined until there is a non-uniform ejection from the nozzles. The results are shown in the following Table 1.

As used herein, ⊚ denotes normal ejection despite a waiting time of over 300 seconds; ○ denotes normal ejection despite a waiting time ranging from 200 to 300 seconds; Δ denotes normal ejection despite a waiting time ranging from 100 to 200 seconds; and x denotes normal ejection despite a waiting time of less than 100 seconds. In addition, when the ink is not ejected because one of the nozzles is clogged or the ink did not drop on a pixel even if it was ejected, these are categorized as bad.

(3) Heat Resistance Evaluation

The color filter ink compositions of Examples 1 to 13 and Comparative Examples 1 and 2 are printed to be 1 to 2 μm thick on a black matrix substrate and dried at 220° C. for 40 minutes in a forced convection drying oven to form a pattern. This pattern is allowed to stand in a 220° C. forced convection drying oven for 1 to 3 hours, and is then photographed with an optical microscope by taking an optical picture. The optical picture is used to examine pattern changes with the naked eye. In addition, color difference is examined by measuring ΔE with a colorimeter. The results are shown in the following Table 1.

In the following Table 1, ○ denotes no pattern change and color difference (ΔE) of less than 3.0; Δ denotes a little pattern change or a color difference (ΔE) ranging from 3.0 to 5.0; and x denotes much pattern change or a color difference (ΔE) of more than 5.0.

(4) Chemical Resistance Evaluation

The color filter ink compositions of Examples 1 to 13 and Comparative Examples 1 and 2 are printed to be 1 to 2 μm thick on a black matrix substrate and dried at 220° C. for 40 minutes with a forced convection drying oven, acquiring a pattern. This patterned substrate is soaked in a 5% sodium hydroxide aqueous solution, N-methylpyrrolidone (NMP), tetramethyl ammonium hydroxide (TMAH), and γ-butyrolactone (γ-GBL) for 30 to 40 minutes and dried, and its pattern change is photographed with an optical microscope. Then, the optical photograph is examined with the naked eye. In addition, the color difference (ΔE) is measured with a colorimeter. These chemical resistance measurement results are shown in the following Table 1.

Referring the following Table 1, ⊚ denotes no pattern change and a color difference (ΔE) of less than 0.1; ○ denotes no pattern change and a color difference (ΔE) of less than 3.0; Δ denotes a little pattern change and a color difference (ΔE) ranging from 3.0 to 5.0; and x denotes much pattern change and a color difference (ΔE) of more than 5.0.

(5) Film Hardness Evaluation

The color filter ink compositions of Examples 1 to 13 and Comparative Examples 1 and 2 are coated to be 1 to 2 μm thick on a 0.7 mm-thick degreased and washed glass substrate at 220° C. for 40 minutes in a convection oven. The prepared ink coating layers are evaluated regarding strength according to damage received when they are scratched with 1H to 6H pencils (Staedtler Co.). The results are shown in the following Table 1.

(6) Storage Stability Evaluation

The color filter ink compositions of Examples 1 to 13 and Comparative Examples 1 and 2 are stored at a constant temperature of 40° C. for a week to measure viscosity change. As used herein, ○ denotes no viscosity change or a viscosity change of less than 0.2 cPs, Δ denotes a clear viscosity change ranging from 0.2 to 0.5 cPs, and x denotes a sharp viscosity change of more than 0.5 cPs.

(7) Close Contacting Property

Cleaned and degreased glass substrates having a thickness of 0.7 mm are coated with the color filter ink compositions according to Examples 1 to 13 and Comparative Examples 1 and 2, respectively, at a thickness of 1.5 μm, and dried in a hot-air drying furnace at 220° C. for 40 minutes to obtain coating layers. 100 block shapes with dimensions of 1 mm×1 mm are formed, peeled off with a cellophane tape, and then peeling degree is evaluated with the naked eye. These close contacting propery measurement results are shown in the following Table 1.

Referring to the following Table 1, ⊚ denotes that the number of blocks peeled off/total number is 100/100 (no peeling off); ○ denotes that the number of blocks peeled off/total number ranges from 90/100 to 99/100; Δ denotes that the number of blocks peeled off/total number ranges from 80/100 to 89/100; and x denotes that the number of blocks peeled off/total number ranges from 0/100 to 79/100.

TABLE 1

|  | Ejection Properties | Long Ejection Properties | Heat Resistance | Chemical Resistance | Film Hardness | Storage Stability | Close contacting property |
|---|---|---|---|---|---|---|---|
| Example 1 | ⊚ | ⊚ | ○ | ○ | 3H | ○ | Δ |
| Example 2 | ○ | ○ | ○ | ⊚ | 4H | ○ | ⊚ |
| Example 3 | ○ | ⊚ | ○ | ⊚ | 4H | ○ | ○ |
| Example 4 | ○ | ○ | ○ | ○ | 3H | ○ | ○ |
| Example 5 | ⊚ | ⊚ | ○ | ○ | 4H | ○ | ⊚ |
| Example 6 | ○ | ○ | ○ | ○ | 4H | ○ | ⊚ |
| Example 7 | ⊚ | ⊚ | ○ | ○ | 4H | ○ | ⊚ |
| Example 8 | ○ | ○ | ○ | ⊚ | 4H | ○ | ⊚ |
| Example 9 | ⊚ | ○ | ○ | ○ | 4H | ○ | ⊚ |
| Example 10 | ○ | ○ | ○ | ⊚ | 4H | ○ | ⊚ |
| Example 11 | ⊚ | ○ | ○ | ○ | 4H | ○ | ⊚ |
| Example 12 | ○ | ○ | ○ | ⊚ | 4H | Δ | ⊚ |
| Example 13 | ○ | ○ | ○ | ⊚ | 4H | ○ | ⊚ |
| Comparative Example 1 | X | X | ○ | X-Δ | 2H | Δ | X |
| Comparative Example 2 | X-Δ | X | ○ | Δ | 3H | X | Δ |

Referring to Table 1, the ink compositions of Examples 1 to 13 have higher chemical resistance, film hardness, storage stability, and close contacting properties than those of Comparative Examples 1 and 2.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A color filter ink composition comprising:
an acrylic-based copolymer resin including repeating units represented by the following Formulae 1 to 3, a polymerizable monomer, a pigment, and a solvent,

[Chemical Formula 1]

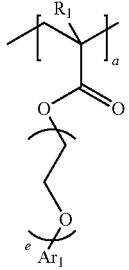

[Chemical Formula 2]

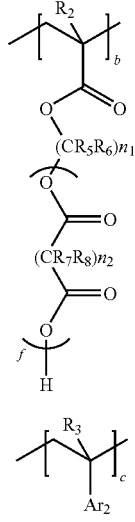

[Chemical Formula 3]

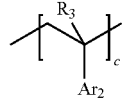

wherein, in the above Formulae 1 to 3,
$R_1$ to $R_3$ and $R_5$ to $R_8$ are the same or independently selected from the group consisting of hydrogen and substituted or unsubstituted linear or branched alkyl;
$Ar_1$ and $Ar_2$ are the same or independently selected from the group consisting of substituted or unsubstituted aryl and substituted or unsubstituted heteroaryl;
n1 and n2 are the same or independently an integer ranging from 1 to 5;
e is an integer ranging from 1 to 10;
f is an integer ranging from 1 to 5; and
each of a, b, and c represents 1 to 50 mole % based on the total moles of monomers of the acrylic based copolymer resin,
wherein the color filter ink composition comprises a high boiling-point solvent having a boiling point of 170 to 250° C. and a low boiling-point solvent having a boiling point of less than 170° C.,
wherein the weight ratio of the high boiling-point solvent and the low boiling-point solvent is 99:1 to 50:50,
and wherein the term substituted refers to one or more substituents selected from the group consisting of hydroxy, halogen, linear alkyl, branched alkyl, cycloalkyl, heterocycloalkyl, alkoxy, aryl, heteroaryl, and alkenyl and the terms heterocycloalkyl and heteroaryl refer to cycloalkyl and aryl, respectively, including 1 to 20 heteroatoms selected from the group consisting of N, O, S, and Si.

2. The color filter ink composition of claim 1, wherein the acrylic-based copolymer resin further comprises a repeating unit of the following Formula 4:

[Chemical Formula 4]

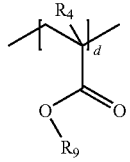

wherein, in the above Formula 4,
$R_4$ is selected from the group consisting of hydrogen and substituted or unsubstituted linear or branched alkyl;
$R_9$ is selected from the group consisting of substituted or unsubstituted linear or branched alkyl, substituted or unsubstituted cycloalkyl, substituted or unsubstituted heterocycloalkyl, norbornyl, and substituted or unsubstituted alcohol; and
d represents 0.1 to 50 mole % based on the total moles of monomers of the acrylic-based copolymer,
wherein the term substituted has the same meaning as in claim 1.

3. The color filter ink composition of claim 2, wherein $R_9$ is alkyl substituted with alkoxy or aryl, $-CH_3$, $-C_2H_5$, $-C_4H_9$, $-(CH_2)_3CH_3$, $-CH_2CH(CH_3)_2$, $-C(CH_3)_3$, $-CH_2CH(C_2H_5)C_4H_9$, $-CH_2CH(CH_3)CH_2CH(CH_3)CH_2CH(CH_3)_2$, $-C12H_{25}$, $-C_{13}H_{27}$, $-C_{14}H_{29}$, $-C_{15}H_{31}$, $-C_{16}H_{33}$, $-C_{17}H_{35}$, $-C_{18}H_{37}$, $-C_2H_4OC_4H_9$, $-(CH_2CH_2O)_2C_4H_9$, $-(CH_2CH_2O)_3CH_3$, $-(CH_2CH_2O)_9CH_3$, cyclohexyl, tetrahydrofuranyl, benzyl (−CH−phenyl), norbornyl, biscyclopentanyl, $-CH_2CH_2OH$, $-CH_2CH(OH)CH_3$, $-CH_2CH(OH)CH_3$, $-CH_2CH(OH)CH_2CH_3$, glycidyl, or combinations thereof.

4. The color filter ink composition of claim 1, wherein the color filter ink composition comprises 1 to 40 wt % of the acrylic-based copolymer resin, 1 to 20 wt % of the polymerizable monomer, 1 to 40 wt % of the pigment, and the balance of the solvent.

5. The color filter ink composition of claim 1, wherein the high boiling-point solvent is selected from the group consisting of 3-methoxy butyl acetate, diethylene glycol methyl ether acetate, diethylene glycol ethyl ether acetate, diethylene glycol butyl ether acetate, ethylene glycol butyl ether acetate, 1,3-butanediol diacetate, propylene glycol n-propyl ether acetate, propylene glycol n-butyl ether acetate, dipropylene glycol n-propyl ether acetate, dipropylene glycol n-butyl ether acetate, propylene glycol diacetate, dipropylene glycol propyl ether, dipropylene glycol butyl ether, tripropylene glycol methyl ether, diethylene glycol dibutyl ether, tripropylene glycol butyl ether, and combinations thereof.

6. The color filter ink composition of claim 1, wherein the low boiling-point solvent is selected from the group consisting of ethylacetate, n-butylacetate, isobutylacetate, isopropylacetate, n-propylacetate, propylene glycol methyl ether acetate, propylene glycol ethyl ether acetate, 3-methoxy-1-propyl acetate, ethylene glycol methyl ether acetate, ethylene glycol ethyl ether acetate, propylene glycol methyl ether, propylene glycol ethyl ether, propylene glycol propyl ether, propylene glycol diacetate, ethylene glycol propyl ether, n-butyl propionate, 3-ethoxy ethyl propionate, n-pentyl propionate, n-propyl propionate, propylene glycol methyl ether propionate, and combinations thereof.

7. The color filter ink composition of claim 1, wherein the composition comprises a polymerization initiator in an amount of 0.1 to 10 parts by weight based on 100 parts by weight of the color filter ink composition.

8. The color filter ink composition of claim 1, wherein the acrylic-based copolymer resin is selected from the group consisting of:

[Chemical Formula 5]

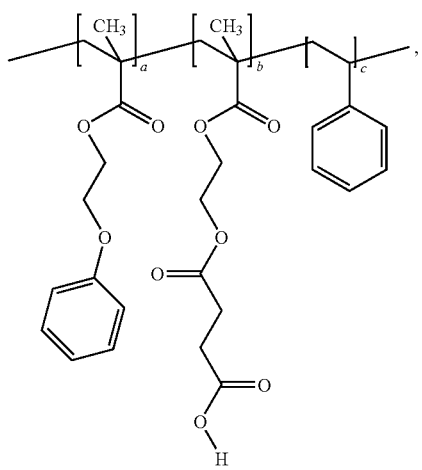

[Chemical Formula 6]

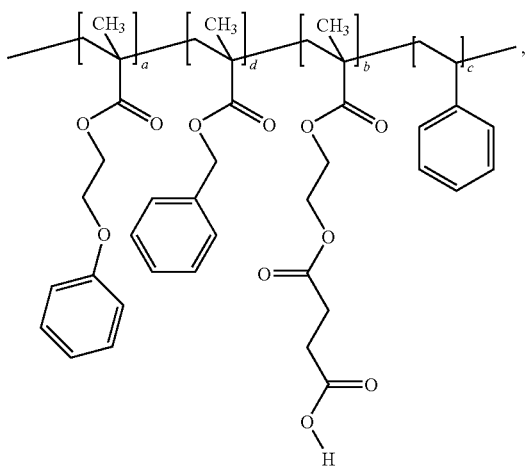

[Chemical Formula 7]

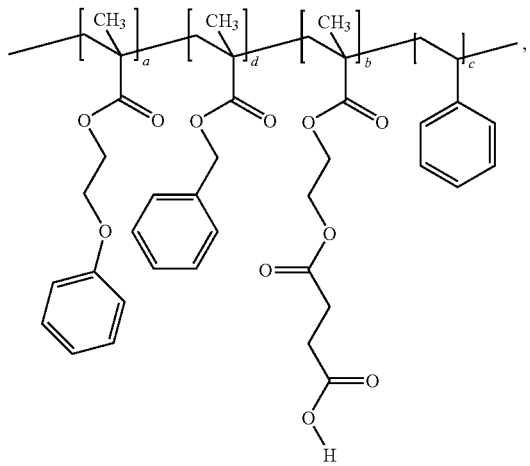

[Chemical Formula 8]

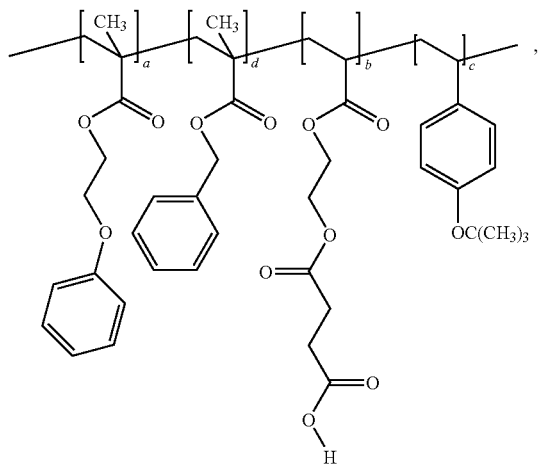

[Chemical Formula 9]

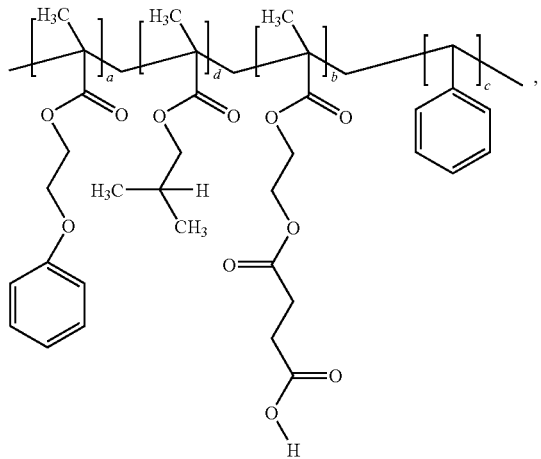

[Chemical Formula 10]

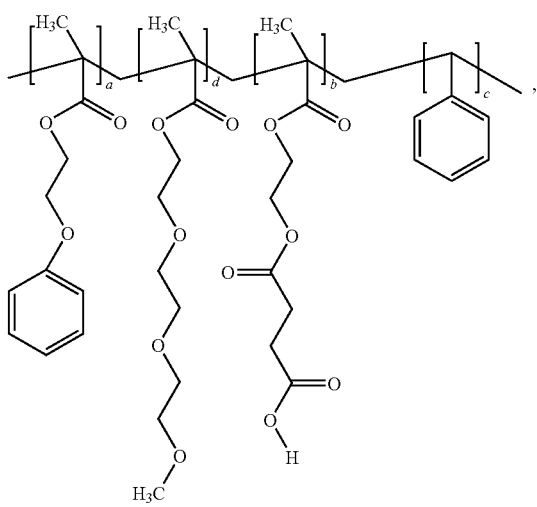

[Chemical Formula 11]

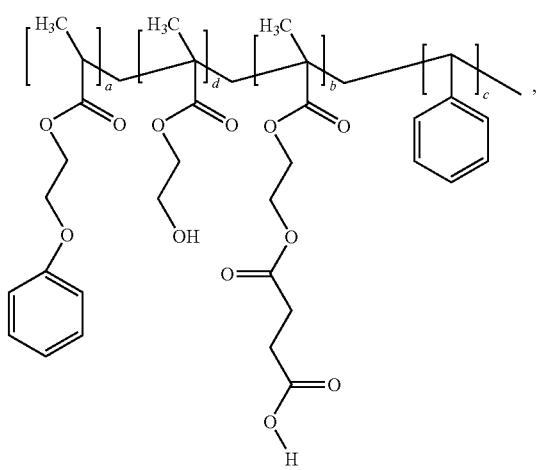

[Chemical Formula 12]

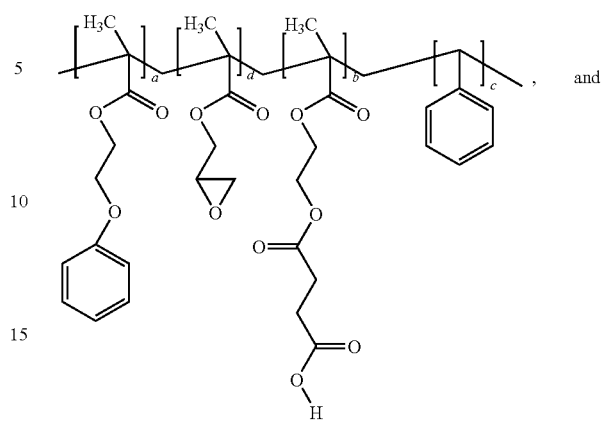

, and

[Chemical Formula 13]

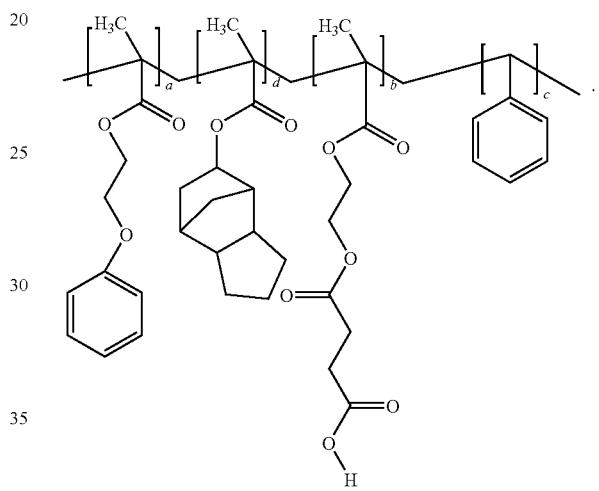

.

wherein each of a, b, and c represents 1 to 50 mole % based on the total moles of monomers of the acrylic based copolymer resin; and d represents 0.1 to 50 mole % based on the total moles of monomers of the acrylic-based copolymer.

9. A method of making a pixel of a display color filter, comprising:

coating the ink composition according to claim 1 on a substrate using an inkjet spraying method to form a pattern; and curing the pattern.

10. A color filter comprising the pixel of a display color filter fabricated according to claim 9.

* * * * *

UNITED STATES PATENT AND TRADEMARK OFFICE
CERTIFICATE OF CORRECTION

PATENT NO. : 8,513,332 B2  Page 1 of 1
APPLICATION NO. : 12/761473
DATED : August 20, 2013
INVENTOR(S) : Jong-Seung Park et al.

It is certified that error appears in the above-identified patent and that said Letters Patent is hereby corrected as shown below:

On the Title Page, Item (56)

In the Bibliographic Data:

Omitted under "U.S. Patent Documents"

5,696,182 A    12/1997    Kashiwazaki et al.

Omitted under "Foreign Patent Documents"

EP   0616017           9/1994
JP   2003-128966       5/2003
KR   10-2006-0065807   6/2006

Signed and Sealed this
Twenty-fourth Day of December, 2013

Margaret A. Focarino
*Commissioner for Patents of the United States Patent and Trademark Office*